US006693805B1

United States Patent
Steigerwald et al.

(10) Patent No.: US 6,693,805 B1
(45) Date of Patent: Feb. 17, 2004

(54) RIPPLE CANCELLATION CIRCUIT FOR ULTRA-LOW-NOISE POWER SUPPLIES

(75) Inventors: Robert Louis Steigerwald, Burnt Hills, NY (US); Michael Joseph Schutten, Rotterdam, NY (US)

(73) Assignee: Lockheed Martin Corporation ( * ) Notice: Subject to any disclaimer, the term of this patent is extended or adjusted under 35 U.S.C. 154(b) by 0 days.

(21) Appl. No.: 10/209,034

(22) Filed: Jul. 31, 2002

(51) Int. Cl.$^7$ ............................................... H02M 1/14
(52) U.S. Cl. ........................... 363/39; 363/46; 323/259; 323/290
(58) Field of Search ............................. 363/39, 40, 45, 363/46, 47, 48, 124; 323/222, 259, 272, 282, 290, 293, 344, 345

(56) References Cited

U.S. PATENT DOCUMENTS

| 3,761,797 | A | * | 9/1973 | Spooner ..................... 363/46 |
| 4,163,926 | A | | 8/1979 | Willis |
| 4,190,791 | A | | 2/1980 | Hicks |
| 4,274,133 | A | * | 6/1981 | Cuk et al. .................... 363/39 |
| 4,298,892 | A | | 11/1981 | Scott |
| 4,488,057 | A | | 12/1984 | Clarke |
| 4,594,648 | A | * | 6/1986 | Gallios ....................... 363/46 |
| 4,703,409 | A | | 10/1987 | Spreen |
| 4,713,742 | A | * | 12/1987 | Parsley ....................... 363/124 |
| 4,761,722 | A | | 8/1988 | Pruitt |
| 4,780,802 | A | | 10/1988 | Miyashita et al. |
| 4,782,272 | A | | 11/1988 | Buckley et al. |
| 4,829,232 | A | * | 5/1989 | Erickson, Jr. ............... 323/290 |
| 4,999,524 | A | | 3/1991 | Williams et al. |
| 5,602,464 | A | | 2/1997 | Linkowsky et al. |
| 5,694,302 | A | * | 12/1997 | Faulk ........................... 363/16 |
| 6,347,045 | B1 | * | 2/2002 | Poon et al. .................. 363/39 |

* cited by examiner

*Primary Examiner*—Michael Sherry
*Assistant Examiner*—Gary L. Laxton
(74) *Attorney, Agent, or Firm*—Duane Morris LLP

(57) ABSTRACT

A low-ripple power supply includes a storage capacitor coupled across load terminals, and an inductor connected to a source of voltage including a varying or pulsatory component and a direct component, for causing a flow of current to said capacitor through the inductor. The varying component of the inductor current flowing in the capacitor results in ripple across the load. A winding is coupled to the inductor for generating a surrogate of the varying inductor current. The surrogate current is added to the inductor current to cancel or reduce the magnitude of the varying current component. This cancellation effectively reduces the varying current component flowing in the storage capacitor, which in turn reduces the ripple appearing across the load terminals.(121)

15 Claims, 6 Drawing Sheets

RIPPLE CANCELLATION CIRCUIT FOR ULTRA-LOW-NOISE POWER SUPPLIES

FIELD OF THE INVENTION

This invention relates to direct-voltage power supplies, and more particularly to low-noise or low-ripple power supplies.

BACKGROUND OF THE INVENTION

Much of the advance in standard of living over the past twenty or so years results from the use of advanced communications, data processing, and environmental sensing techniques. The devices used in such communications, processing, and sensing generally become more useful as their sizes are decreased, such that more of them can be used. For example, computers and cellular phones require ever-smaller elements, and become more capable as the number of devices which can be accommodated increases. Similarly, lightweight and reliable sensors can be used in large numbers in vehicles to aid in control and, in the case of spacecraft and military vehicles, to aid in carrying out their missions.

Most modern semiconductor devices, and other devices important for the above purposes, are generally energized or biased by direct voltages. As devices have become smaller, their powering requirements also advantageously decrease. Unfortunately, a concomitant of low power requirements is often sensitivity to unintended noise or fluctuations in the applied power. It is easy to understand that extremely small transistors, which ordinarily operate at two or three volts, could be destroyed by application of tens of volts. It is less apparent but true that small-percentage variations or noise on the applied powering voltage may result in degradation of the operating characteristics of semiconductor and other devices and the circuits in which they operate, which may adversely affect the performance. It is a commonplace that conventional radio and television receivers will respond to noise on or sudden changes in their supply voltages with aural or visual distortions, or both.

In general, electronic equipments require direct voltages for their power sources. There are two general sources of electrical energy which can be used to provide the power, and these two sources are batteries, which provide direct voltage, and power mains of an alternating voltage. When power mains are the source of electrical energy, it is common to rectify the alternating voltage to achieve a direct voltage. The power mains are used to drive machine motors in addition to electronic equipment, so the mains voltages tend to be higher than the voltages required for electronic equipment, and rectified voltages also tend to be higher than desired or usable. In the past, transformers have been used to convert the mains power to voltages more compatible with electronic equipment. However, transformers operating at 60 Hz tend to be much larger than is desirable in modern miniaturized equipment. It might be thought that there are no problems with the powering of electronic equipment from batteries, which directly provide direct voltage. However, batteries have the same general problem as that of mains powering, namely that available direct voltage does not necessarily correspond with the desired operating voltage. One modern technique for producing voltages for powering electronic equipment is that of use of a switching power supply or switching converter, which changes a direct source voltage to a different direct voltage.

A switching power converter can operate from a direct voltage derived from the power mains or from a battery, and can either increase or decrease the output voltage relative to the input voltage. These switching power converters take many different forms, some examples of which include those described in U.S. Pat. Nos. 4,163,926 issued Aug. 7, 1979 in the name of Willis; U.S. Pat. No. 4,190,791, issued Feb. 26, 1980 in the name of Hicks; U.S. Pat. No. 4,298,892 issued Nov. 3, 1981 in the name of Scott; U.S. Pat. No. 4,761,722 issued Aug. 2, 1988 in the name of Pruitt; and U.S. Pat. No. 5,602,464 issued Feb. 11, 1997 in the name of Linkowski et al.

SUMMARY OF THE INVENTION

A power supply according to an aspect of the invention powers a load. A storage capacitor is coupled across the load. A first inductance arrangement is coupled to the storage capacitor, which is coupled across the load, to thereby form a combined circuit. A source of voltage produces a direct voltage component and a time-varying voltage component. The source of voltage is coupled to the combined circuit for producing a flow of current therethrough, which flow of current results in division of the direct voltage component and the time-varying voltage component between at least the first inductance arrangement and the storage capacitor coupled across the load, whereby that portion of the time-varying voltage component appearing across the first inductance arrangement tends to cause a time-varying current flow through the first inductance arrangement. A magnetically coupled inductive arrangement is responsive to the time-varying voltage component appearing across the inductance arrangement, for generating a second time-varying current component in response to the time-varying voltage. The second time-varying current component is similar to the time-varying current flow through the first inductance arrangement. A combining arrangement is coupled to the combined circuit and to the magnetically coupled inductive arrangement, for combining the second time-varying current component with at least the time-varying current flow in such a manner as to tend to oppose the time-varying current flow.

In one embodiment, the source of voltage includes a switch which recurrently applies a raw direct voltage to the combined circuit, and applies a reference potential across the combined circuit during those intervals in which the raw direct voltage is not applied, whereby the time-varying component is a rectangular wave.

In another embodiment, of the power supply, the source of voltage comprises a phase-shifted full-wave switched bridge circuit including first and second tap points across which an alternating voltage is generated, and a transformer including a primary winding connected to the first and second tap points. The transformer also includes a secondary winding across which a varying voltage is generated in response to the alternating voltage. The source of voltage also includes a rectifying arrangement coupled to the secondary winding for converting the varying voltage into a varying or pulsating direct voltage.

In one version of a power supply according to an aspect of the invention, the magnetically coupled inductive arrangement comprises an inductive winding magnetically coupled to the first inductive arrangement, whereby the second time-varying current component is directly generated. In another version of a power supply according to this aspect of the invention, the magnetically coupled inductive arrangement comprises a transformer including a primary winding coupled across the first inductance arrangement, and also including a secondary winding across which a secondary voltage is generated in response to the time-varying voltage component appearing across the first inductance arrangement. An inductor or other inductance means is coupled in series with the secondary winding of the transformer, for producing the second time-varying current component in response to the secondary voltage.

A power supply according to an aspect of the invention, in which the first inductance means and the magnetically coupled inductive means responsive to the time-varying voltage component appearing across the inductance means, for generating a second time-varying current component in response thereto, comprises a unitary arrangement, and the unitary arrangement comprises a magnetic core with first and second spaced-apart magnetic paths through which magnetic flux flows. The first inductance means includes a conductor winding about the first magnetic path, and the magnetically coupled inductive means comprising a conductor winding about the second magnetic path. In a first variant of this arrangement, the magnetic core is in the form of two half-cores, each having a cross-sectional shape in the general form of the letter "U," spaced apart by a pair of gaps located at the distal ends of the legs, and the first magnetic path comprises one leg of each of the halves together with one of the gaps, and the second magnetic path comprises another leg of each of the halves together with another of the gaps. In a second variant of this arrangement, the magnetic core is in the form of one of an E or pot core in two halves having legs, where each half has a cross-section in the general shape of the letter "E," which halves fit together with a gap between the center legs of the halves. In this second variant, the first magnetic path includes the center leg of one of the halves of the core, and the second magnetic path includes the center leg of the other one of the halves of the core. In a third variant, the magnetic core is in the form of an E core in two halves, each of which halves has a cross-section defining three legs and a base in the general shape of the letter "E," which halves fit together with a first gap between the center legs of the halves and a second gap between one pair of outer legs. In this third variant, the first magnetic path includes the one pair of outer legs of the halves of the core and the second gap, and the second magnetic path includes the other of the outer legs of the halves of the core and no gap.

In yet another hypostasis of the invention, the combining arrangement comprises a direct-voltage blocking capacitor. This blocking capacitor may be placed in series with the inductive winding of the one embodiment or in series with the secondary winding and inductor of the other embodiment.

DESCRIPTION OF THE INVENTION

Figure 1:
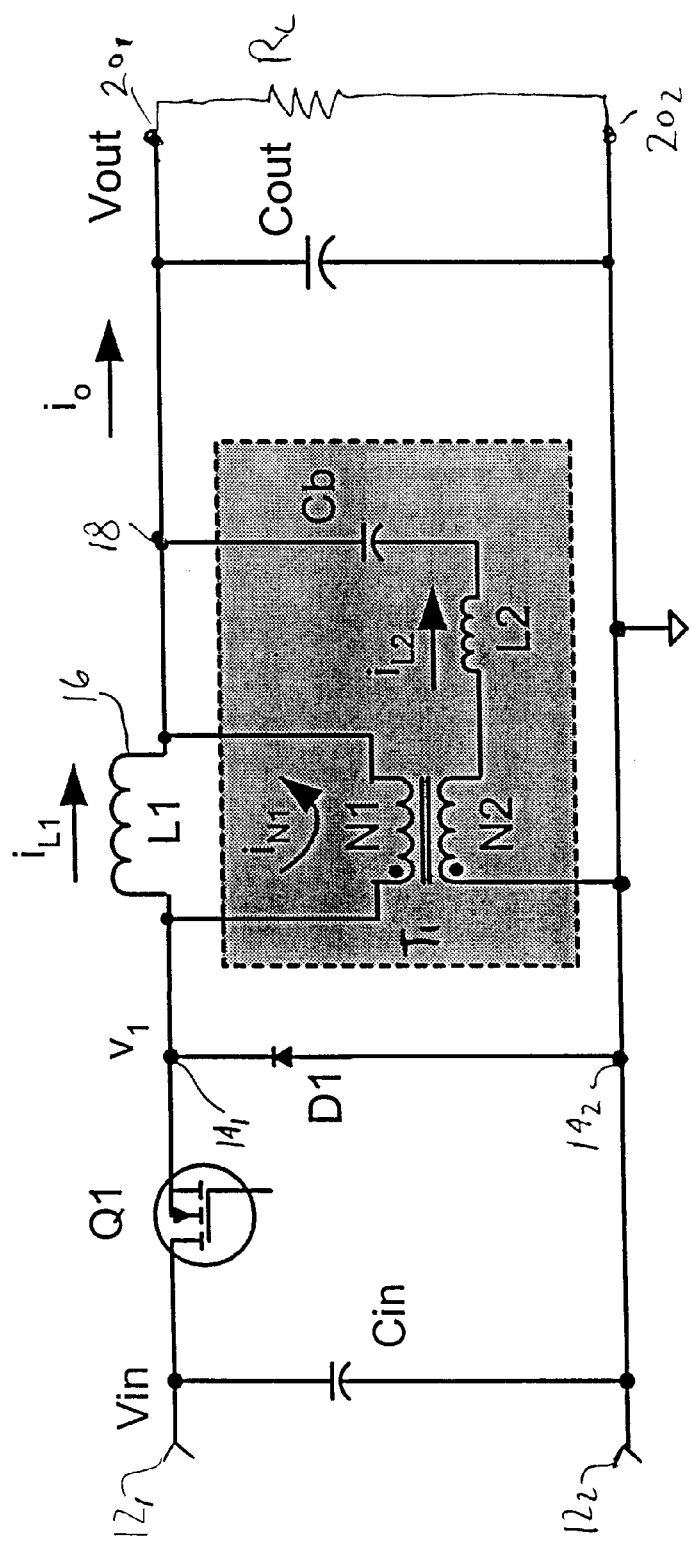
FIG. 1 is a simplified schematic diagram of a switching buck voltage regulator with current ripple cancellation according to an aspect of the invention.

In FIG. 1, an unregulated or "raw" direct voltage Vin is applied from a source (not illustrated) to regulator or power supply 10 input terminals $12_1$, and $12_2$. A controllable switch illustrated as a field-effect transistor (FET) Q1 is controlled, by means which are not illustrated but which are well known in the art, to switch in a recurrent manner. The switching may be periodic or aperiodic, but the effect is to recurrently apply the Vin voltage "across" terminals $14_1$, and $14_2$, as illustrated by plot v1(t) of FIG. 2a in the intervals t0 to t1, t0' to t1', and t0" to t1". Those skilled in the art will understand that the words "across" and "between" as used in electrical contexts have no particular physical meaning as might be ascribed in a mechanical or common context.

As illustrated in FIG. 1, power supply 10 includes an inductor or inductive arrangement 16 connected in "series" with an output filter capacitor Cout, and the resulting series combination or combined circuit is connected across terminals $14_1$, and $14_2$ for receiving the varying or pulsatory voltage v1(t). Under the impetus of each voltage pulse in the intervals t0 to t1, t0' to t1', and t0" to t1" of FIG. 2a, electrical current through inductor L1 increases, as illustrated in the relevant intervals by plot $(I_{L1}+I_{N1})$ in FIG. 2b. In this context, $I_{L1}$, represents the magnetizing or inductive current component flowing in inductor L1. The increasing current flow through the inductor L1 in the intervals t0 to t1, t0' to t1', and t0" to t1" of FIG. 2a flows as current $I_0$ through output filter capacitor Cout. Since output capacitor Cout is relatively large, its ac voltage is small and most time varying currents flow therethrough. As known to those skilled in the art, the flow of increasing current results, in general, in an increasing output voltage Vout across output filter capacitor Cout, although the current drawn by the load, represented by resistor $R_L$ in FIG. 1, may under some conditions exceed the inductor current, thereby resulting in a net reduction of Vout. The voltage across output filter capacitor Cout is the voltage available to supply the load represented by resistor $R_L$.

There are many ways to view the effects of the pulsating or varying supply voltage v1(t) applied across the series combination of inductor L1 and output filter capacitor Cout. The applied voltage v1(t) may be viewed as consisting of a direct voltage component with a pulsatory voltage component superposed thereon. The inductor and capacitor may be viewed as a voltage divider, in which case the direct voltage component of v1(t) may be viewed as being developed solely across the output filter capacitor, as in steady-state operation the inductor L1 cannot develop or withstand a direct voltage. In this voltage divider view, the alternating component of the applied voltage v1(t) may be viewed as appearing across the inductance of inductor L1, assuming that output filter capacitor Cout has zero impedance. However, filter capacitors do not have zero impedance, so some portion of the applied pulsatory or varying component of the applied voltage v1(t) will appear across output filter capacitor Cout. This portion of the pulsatory voltage is then an undesired ripple which is manifest across the load $R_L$. In an alternative view, that portion of the pulsatory or varying applied voltage v1(t) which is applied to or across inductor L1 results in a varying current flow in the inductor, which current also flows mostly through the internal impedance of output filter capacitor Cout, and thereby generates an undesired ripple voltage which appears across the load $R_L$.

However the mechanism which generates the ripple across the output filter capacitor is viewed, the ripple is undesirable. According to an aspect of the invention, an additional current is generated, which ideally is equal in magnitude and opposite in phase to the alternating component of the current through the inductor L1, and this additional current is supplied to output filter capacitor Cout together with the inductor L1 current, in a phase or polarity which cancels or offsets the alternating component of current. In effect, the output filter capacitor "sees" only a direct current flow because the time-varying currents in inductor L1, winding Ni and auxiliary inductor L2 add to zero. Since no alternating current component flows through the internal impedance of output filter capacitor Cout, no ripple voltage can be generated across the capacitor. Of course, nothing is perfect, so there will necessarily always be some difference between the compensating ripple current and the ripple current actually flowing in the inductor L1 and output filter capacitor Cout which will prevent total cancellation, but significant ripple current reduction should result.

Figure 2:
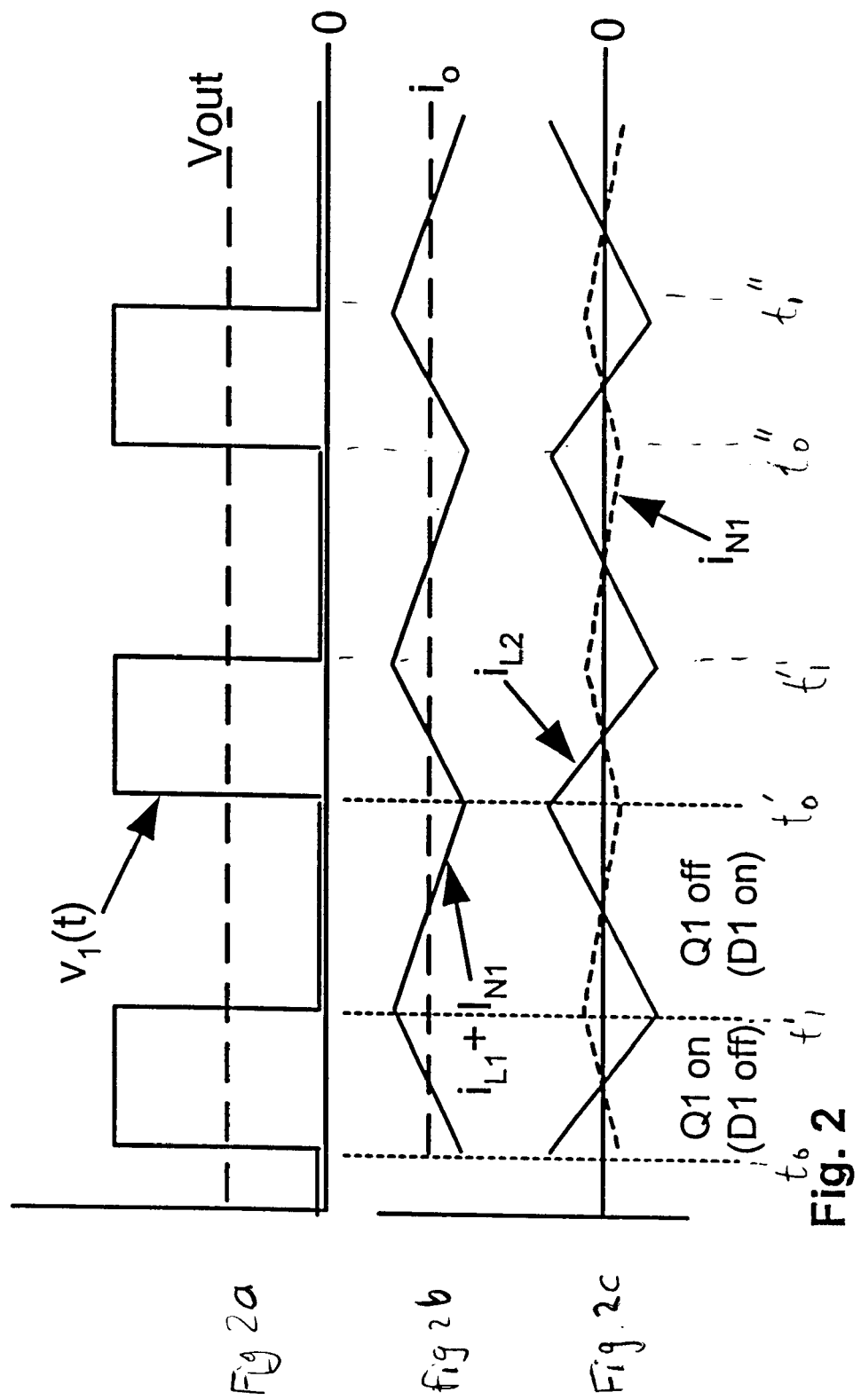
FIGS. 2a. 2b. and 2c are amplitude-time plots of voltages and currents which occur in the regulator of FIG. 1 during operation.

In FIG. 1, a diode D1 has its cathode connected to terminal $14_1$, and its anode connected to terminal $14_2$. Those skilled in the art recognize this as a "freewheeling" diode, which is maintained in a nonconductive condition during those intervals in which the raw supply voltage is coupled through switching transistor Q1, corresponding to intervals t0 to t1, t0' to t1', and t0" to t1" of FIG. 2a. During those intervals when switching transistor Q1 is nonconductive, the energy stored in inductor L1 tends to cause current to continue to flow in the path including Cout and D1, with the result that D1 becomes forward-biased and allows the inductive current to continue flowing in the intervals t1 to t0', t1' to t0", and after t1". When diode D1 is conductive, its voltage drop is small, and may be viewed as being zero for purposes of this analysis. Since the energy stored in inductor L1 is the motive force for the current $IL_1$, the current during intervals t1 to t0', t1' to t0", and after t1", the magnitude of the current decreases, as illustrated in FIG. 2b. Thus, the current flow through inductor L1 includes a varying component which increases during those intervals in which voltage is applied by v1 being positive, and which decreases during those intervals in which diode D1 conducts and a voltage of opposite polarity is applied to inductor L1 by output capacitor Cout.

In FIG. 1, a transformer T1 includes a primary winding designated N1 and a secondary winding designated N2, poled as indicated by the standard dot notation. The primary winding N1 is connected across inductor L1, so that transformer T1 is energized by that varying component of the applied voltage appearing across inductor L1, which in most cases will be the principal portion of the varying component of the applied voltage. The varying component of voltage applied to primary winding N1 of transformer T1 transforms to the secondary N2 side of the transformer. The voltage applied to primary winding N1 of Transformer T1 may be viewed as being similar to the pulsatory or varying component of the voltage applied to terminals $14_1$, and $14_2$, so the voltage across secondary winding N2 may be viewed as a surrogate for the varying component of the applied voltage v1, except for that minor portion appearing across output filter capacitor Cout. The dotted end of secondary winding N2 is connected to terminal $14_2$. The voltage appearing across the secondary winding N2, which is a surrogate for the applied varying voltage component, is applied to a second inductor or inductance arrangement L2, which generates a current which is a surrogate for the varying component of current through inductor L1. Those skilled in the art will know how to select the parameters of transformer T1 and inductor L2 so as to cause the surrogate varying current to substantially equal the varying current component in inductor L2 plus the current in the primary of transformer T1.

A solution for selecting L2 when N2 and N1 are given is $$L_2 = L_1 \left(\frac{N2}{N1}\right)\left(1 - \frac{N2}{N1}\right) \qquad 1$$

where L1, L2, N1, and N2 all have real, positive values.

The three currents are combined by coupling the "output" ends of inductors L1 and L2 together with transformer primary winding N1 at a junction point 18 corresponding to the juncture of "serially" connected inductor L1 and output filter capacitor Cout. In order to avoid the application of direct voltage from junction point 18 to the serial combination of inductor L2 and secondary winding N2, which might result in the flow of excess current to ground, a direct voltage blocking capacitor Cb is placed in the serial connection. As illustrated, blocking capacitor Cb is placed between inductor L2 and tap point 18, but Cb could also be placed between N2 and L2, or alternatively between N2 and ground or connection $14_2$.

In operation of the arrangement of FIG. 1, the switching of Q1 produces a pulsatory or varying voltage v1(t) as described in conjunction with FIG. 2a, with the result that a total current $(I_{L1}+I_{N1})$ flows as illustrated in FIG. 2b, with the $I_{L1}$ component of current flowing through inductor L1, and with the $IN_1$ component flowing through the primary winding N1 of transformer T1. The flow of primary current $iN_1$, of FIG. 2c in transformer T1 results in a flow of varying current $i_{L2}$ through secondary winding N2 and through inductor L2. Comparing current $(I_{L1}+I_{N1})$ of FIG. 2b with current $i_{L2}$ of FIG. 2c shows that they are about equal in magnitude and of opposite phase or polarity, so that the result of their addition at tap point 18 is cancellation of the time-varying component of current. With no varying component of current flowing through output filter capacitor Cout, no ripple voltage is generated thereacross which can appear across the load being energized.

Figure 3:
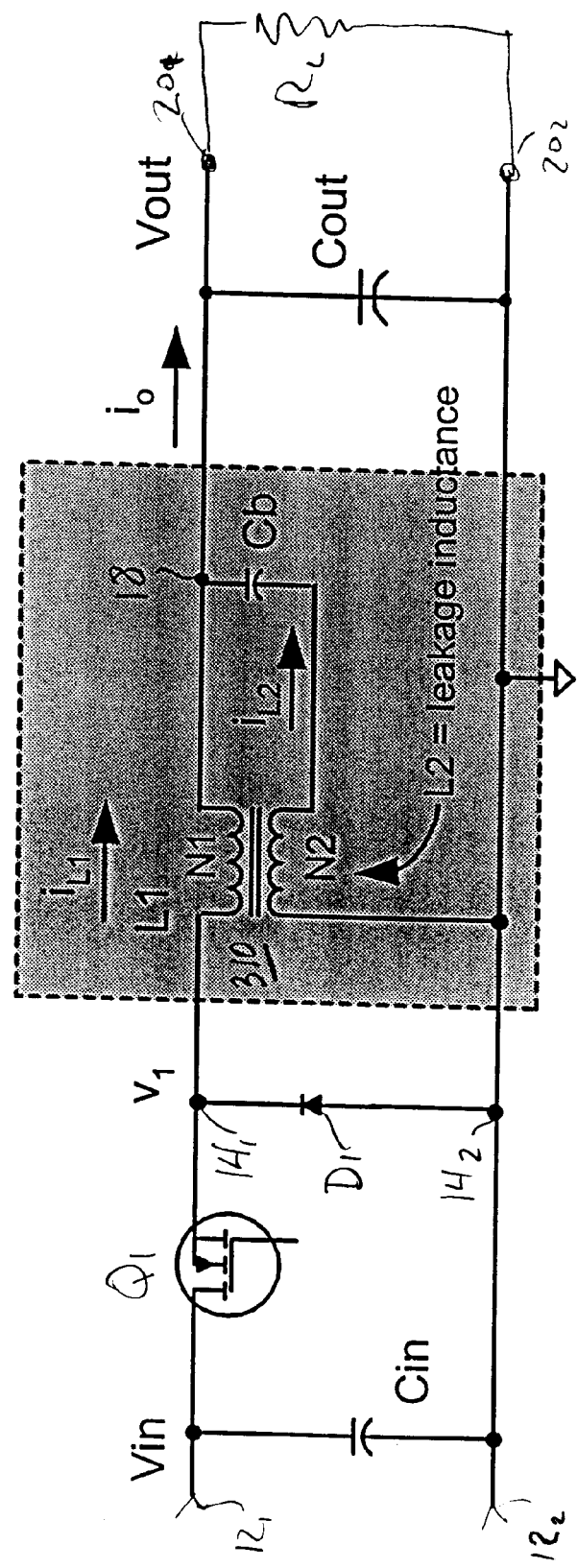
FIG. 3 is a simplified schematic diagram of an alternate embodiment of a regulator according to an aspect of the invention.

FIG. 3 is a simplified schematic diagram of an alternate embodiment of an aspect of the invention. Elements of FIG. 3 corresponding to those of FIG. 1 are designated by like reference alphanumerics. Generally, the arrangement of FIG. 3 substitutes loosely coupled windings for first inductor L1, transformer T1, and second inductor L2. In the arrangement of L1 of FIG. 3, N1 represents an inductive winding having an inductance equivalent to the inductance of winding L1 of FIG. 1. Winding N2 of FIG. 3 is magnetically coupled to winding N1, to thereby produce a resulting voltage in winding N2. However, winding N2 of FIG. 3 is also inductive, at least in part by virtue of its loose coupling to winding N1, and therefore also inherently includes the inductive property which is provided in the arrangement of FIG. 1 by separate inductor L2. Thus, the arrangement of FIG. 3 operates essentially identically to the arrangement of FIG. 1.

Figure 4:
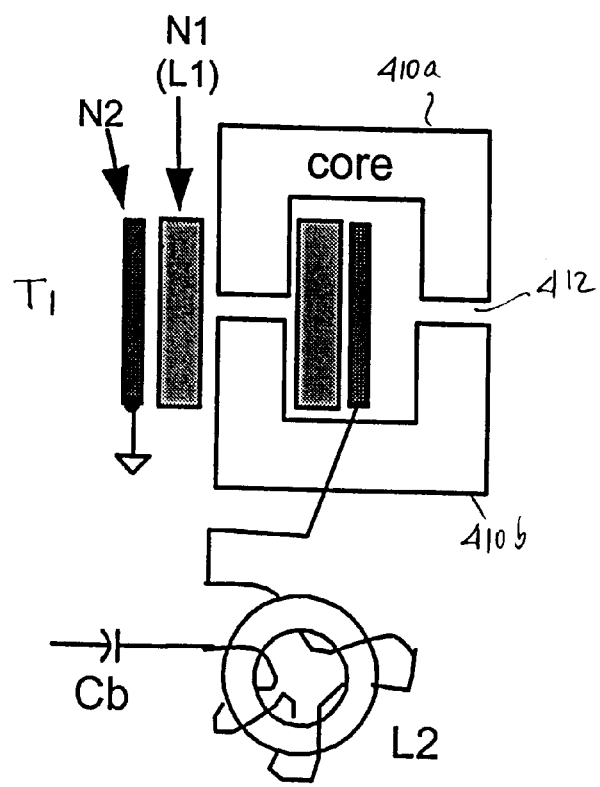
FIG. 4 is a semipictorial representation of the arrangement of transformer T1 and inductor L2 used in the arrangement of FIG. 1.
Figure 5:
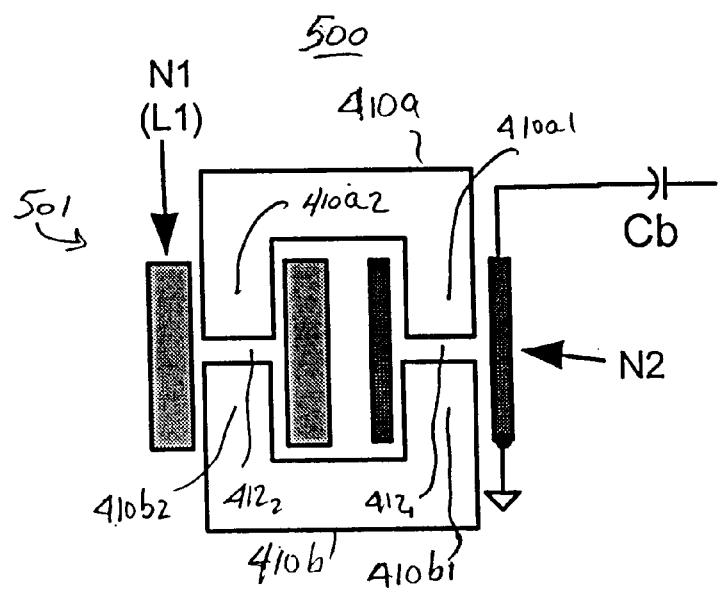
FIG. 5 illustrates one possible arrangement of loosely coupled inductors of FIG. 3.

FIG. 4 is a semipictorial representation of the arrangement of transformer T1 and inductor L2 used in the arrangement of FIG. 1. In FIG. 4, the core is represented by two C sections or halves 410a, 410b defining a gap 412 between legs 410a1 and 410b1. Winding N1 is wound onto one leg of the core, and winding N2 is wound over winding N1, thereby providing substantial magnetic coupling. Inductor L2 is illustrated as a separate winding on a toroidal magnetic core. Capacitor Cb is also shown. By contrast, FIG. 5 illustrates the arrangement of loosely coupled inductors of FIG. 3. In FIG. 5, the core 501 is illustrated as two halves 410a and 410b defining a gap $412_1$ between legs 410a1 and 410b1 and a corresponding gap $412_2$ between legs 410a2 and 410b2. Winding N1, corresponding to the main inductor L1, is illustrated as being wound on the left leg 410a2, 410b2 of the core, and winding N2 is illustrated as being wound on the right leg 410a1, 410b1 of the core. The magnetic coupling between windings N1 and N2 is reduced relative to that of the arrangement of FIG. 4, and the uncoupled inductance of each winding is greater. As illustrated in FIG. 5, capacitor Cb is connected directly to winding N2.

Figure 6:
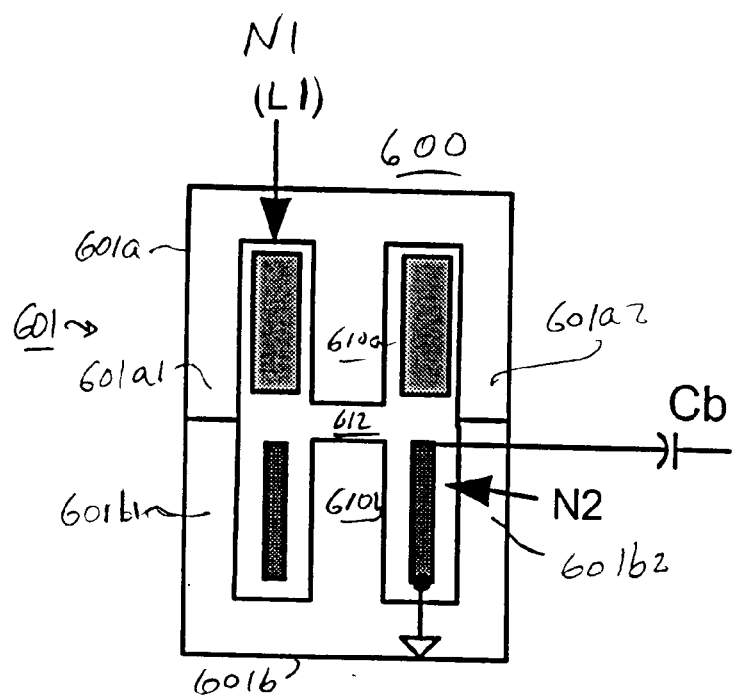
FIG. 6 is a semipictorial representation of an E core or pot core arranged to produce an inductive arrangement for use in FIG. 3.
Figure 7:
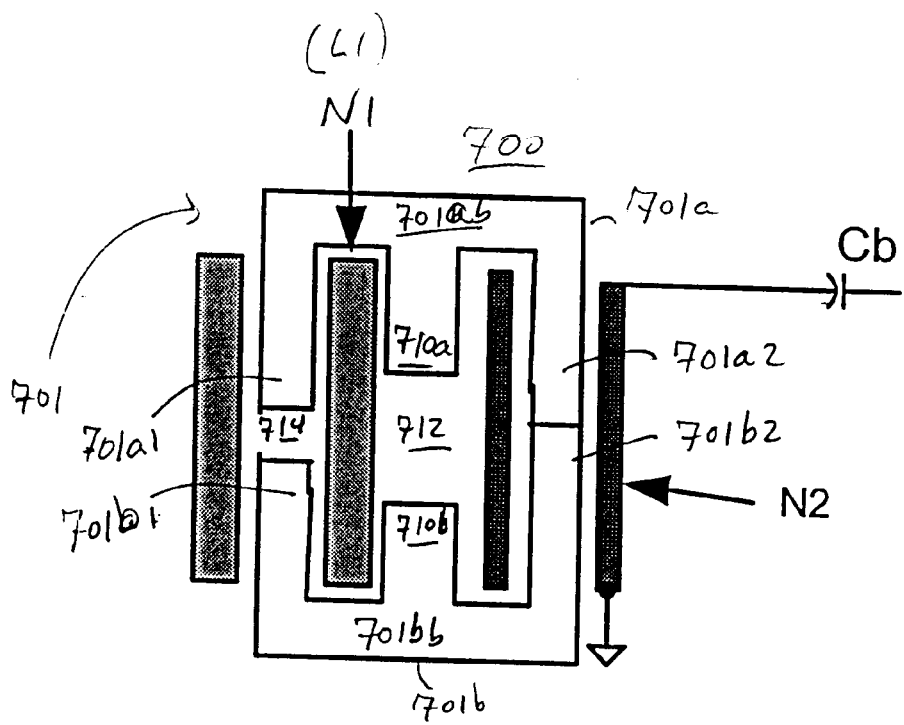
FIG. 7 is an arrangement similar to that of FIG. 5, except in that an additional flux path with an air gap is provided through the center of the core.

FIG. 6 is a semipictorial representation of the use of an E core or a pot core (seen in cross-section) designated 601 to produce an inductive arrangement for use in the arrangement of FIG. 3. In FIG. 6, the coupling between windings N1 and N2 is reduced relative to what it might otherwise be by the spatial separation of the windings. The core 601 is in the form of two halves 601a, 601b, each of which has the general shape of the letter "E," with upper half 601a having outer legs 601a1 and 601a2, and a center leg 610a, and with lower half 601b having outer legs 601b1 and 601b2 and a center leg 610b. The gap 612 between center legs 610a and 610b in the central portion of the core is set to give the correct value of inductance L1. FIG. 7 is an arrangement 700 generally similar to that of FIG. 5, except in that an additional flux path 710a, 710b with an air gap 712 is provided through the center of the core 701. Winding N2 is wound on legs 701a2, 701b2. The additional flux path 710a, 710b, 712 can be used to affect or decrease the coupling between windings N1 and N2 in a manner controlled by the dimension of the air gap, thus increasing the effective value of the equivalent L2. Such a magnetic shunt insures that, for most applications, the correct value of L1 can be obtained by controlling the air gap 714 on the left leg 701a1, 701b1 while the correct value of L2 can be obtained by shunting coupling flux through the center leg under control of its air gap, while still maintaining the correct turns ratio L1/L2.

Those skilled in the art will recognize that the arrangements of FIGS. 5, 6, and 7 provide for loosely coupled windings which will exhibit more uncoupled inductance than the N1/N2 windings of FIG. 4. Consequently, the arrangements of FIGS. 5, 6, and 7 can provide performance equivalent to that of FIG. 4.

Figure 8:
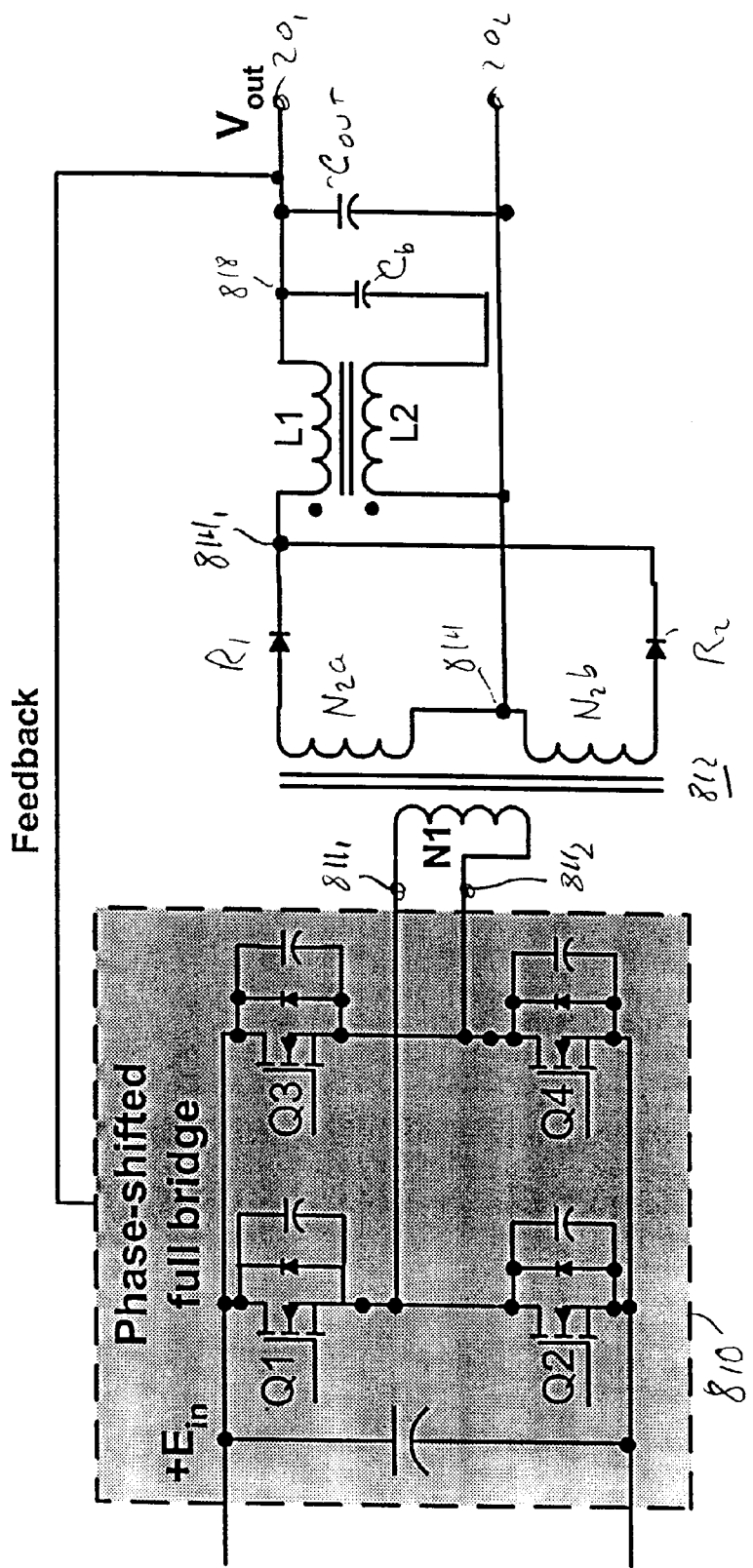
FIG. 8 is a simplified schematic diagram illustrating another aspect of the invention.

FIG. 8 is a simplified schematic diagram illustrating another aspect of the invention. In the arrangement of FIG. 8, the voltage applied to the inductor-capacitor "series" circuit does not come directly from a controllable switch as in FIGS. 1 and 3, but rather comes by way of a rectifier arrangement. In FIG. 8, 810 represents a full-wave bridge circuit including plural controllable switches. As known to those skilled in the art, these switches can be operated in a number of modes. For definiteness, the switches of FIG. 8 are operated by a controller (not illustrated) in a phase-shifted mode, in which the switches are rendered conductive in a manner such as to minimize the voltages across the switches during at least one of turn-on and turn-off. The result of these operations is to produce an alternating voltage across a primary winding N1 of a transformer 812. The alternating voltage applied to primary winding N1 of transformer 812 causes an alternating voltage to be generated across the secondary winding, illustrated as separate windings $N2_a$ and $N2_b$, with a tap point 814 therebetween. A pair of diodes or rectifiers R1 and R2 are illustrated in FIG. 8, with their anodes connected to the ends of secondary windings $N2_a$ and $N2_b$, respectively, which are remote from tap 814. The cathodes of rectifiers R1 and R2 are connected together and to an inductive winding L1. Inductive winding L1 is connected in "series" with an output filter capacitor Cout, as in FIG. 3. An inductive winding L2 is loosely coupled to winding L1 as described in conjunction with FIG. 3, and is connected to reference tap 814 and by way of a blocking capacitor Cb to a junction point 818. With the described arrangement, a voltage having both direct and varying components appears between reference tap 814 and input terminal $814_1$. The alternating voltage is manifest across the series combination of L1 and Cout, as described in conjunction with FIGS. 1 and 3, and the arrangement of winding L2 coupled to point 818 tends to cancel the alternating or varying current components in inductor L2. This, in turn, reduces the magnitude of the alternating current components flowing in capacitor Cout, with consequent reduction in the voltage ripple or noise appearing at the load terminals $20_1$, and $20_2$.

It should be emphasized that the arrangement for cancellation of alternating current components may be used in the case in which an alternating sine wave is rectified to produce "pulsating direct voltage," corresponding to a sequence of unidirectional half-sine-waves. In general, any alternating voltage waveshape that generates an ac current in inductor L1 can be cancelled using the invention.

Thus, speaking very generally, a low-ripple power supply includes a storage capacitor coupled across load terminals, and an inductor connected to a source of voltage including a varying or pulsatory component and a direct component, for causing a flow of current to said capacitor through the inductor. The varying component of the inductor current flowing in the capacitor results in ripple across the load. A winding is coupled to the inductor for generating a surrogate of the varying inductor current. The surrogate current is added to the inductor current to cancel or reduce the magnitude of the varying current component. This cancellation effectively reduces the varying current component flowing in the storage capacitor, which in turn reduces the ripple appearing across the load terminals.

More particularly, a power supply (10) according to an aspect of the invention is capable of powering a load ($R_L$) coupled to load terminals ($20_1$, $20_2$). A storage capacitor (Cout) is coupled across the load ($R_L$) terminals ($20_1$, $20_2$). A first inductance arrangement (L1) is coupled to the storage capacitor (Cout), which is coupled across the load ($R_L$) terminals ($20_1$, $20_2$), to thereby form a combined circuit (L1, Cout). A source of voltage (Vin, Q1, D1) produces a direct voltage component and a time-varying voltage component. The source of voltage (Vin, Q1, D1) is coupled to the combined circuit (L1, Cout) for producing a flow of current therethrough, which flow of current results in division of the direct voltage component and the time-varying voltage component between at least the first inductance arrangement (L1) and the storage capacitor (Cout) coupled across the load ($R_L$) terminals ($20_1$, $20_2$), whereby that portion of the time-varying voltage component appearing across the first inductance arrangement (L1) tends to cause a time-varying current ($i_{L1}$) flow through the first inductance arrangement (L1). A magnetically coupled inductive arrangement (T1, L2; 310) is responsive to the time-varying voltage component appearing across the inductance arrangement (L1), for generating a second time-varying current component ($i_{L2}$) in response to the time-varying voltage. The second time-varying current component ($i_{L2}$) is similar to the time-varying current flow ($i_{L1}$) through the first inductance arrangement (L1). A third time-varying current component ($i_{N1}$) proportional to $i_{L2}$ flows in the primary of the transformer. A combining arrangement (Cb, 18; Cb, 818) is coupled to the combined circuit (L1, Cout) and to the magnetically coupled inductive arrangement (T1, L2; 310), for combining the second time-varying current component ($i_{L2}$) with at least the time-varying current flow ($i_{L1}$) in such a manner as to tend to oppose the time-varying current flow. This may be viewed as a combining of the second time-varying current component ($i_{L2}$) and the third time-varying current ($i_{N1}$) with the time-varying current flow ($i_{L1}$) in such a manner as to tend to oppose the time-varying current flow.

In one embodiment, the source of voltage (Vin, Q1, D1, 810, 812, R1, R2) includes a switch (Q1; 810, 812, R1, R2) which recurrently applies a raw direct voltage to the combined circuit (L1, Cout), and applies a reference potential (diode drop, for example) across the combined circuit (L1, Cout) during those intervals in which the raw direct voltage is not applied, whereby the time-varying component is a rectangular wave.

In another embodiment, of the power supply (10), the source of voltage (Vin, Q1, D1, 810, 812, R1, R2) comprises a phase-shifted full-wave switched bridge circuit (810) including first (811₁) and second (811₂) tap points across which an alternating voltage is generated, and a transformer (812) including a primary winding (N1) connected to the first (811₁) and second (811₂) tap points. The transformer (812) also includes a secondary winding (N2$_a$, N2$_b$) across which a varying voltage is generated in response to the alternating voltage. The source of voltage (Vin, Q1, D1, 810, 812, R1, R2) also includes a rectifying arrangement (R1, R2) coupled to the secondary winding (N2$_a$, N2$_b$) for converting the varying voltage into a varying or pulsating direct voltage.

In one version of a power supply (10) according to an aspect of the invention, the magnetically coupled inductive arrangement (T1, L2; 310) comprises an inductive winding (L2) magnetically coupled to the first inductive arrangement (L1), whereby the second time-varying current component is directly generated. In another version of a power supply (10) according to this aspect of the invention, the magnetically coupled inductive arrangement comprises a transformer (T1) including a primary winding (N1) coupled across the first inductance arrangement (L1), and also including a secondary winding (N2) across which a secondary voltage is generated in response to the time-varying voltage component appearing across the first inductance arrangement (L1). An inductor (L2) or other inductance means is coupled in series with the secondary winding (N2) of the transformer (T1), for producing the second time-varying current component in response to the secondary voltage.

A power supply according to an aspect of the invention, in which (a) the first inductance means and (b) the magnetically coupled inductive means responsive to the time-varying voltage component appearing across the inductance means, for generating a second time-varying current component in response thereto, comprises a unitary magnetic arrangement (500, 600, 700). This unitary magnetic arrangement (500, 600, 700) comprises a magnetic core (501, 601, 701) with first and second spaced-apart magnetic paths through which magnetic flux flows. The first inductance means includes a conductor winding about the first magnetic path, and the magnetically coupled inductive means comprising a conductor winding about the second magnetic path. In a first variant of this arrangement, the magnetic core (500) is in the form of two half-cores (410a, 410b), each having a cross-sectional shape in the general form of the letter "U," spaced apart by a pair of gaps (412₁, 412₂) located at the distal ends of the legs, and the first magnetic path comprises one leg (410a2, 410b2) of each of the halves (410a, 410b) together with one of the gaps (412₂), and the second magnetic path comprises another leg (410a1, 410b1) of each of the halves (410a, 410b) together with another of the gaps (412₁). In a second variant of this arrangement, the magnetic core (600) is in the form of one of an E or pot core in two halves (601a, 601b) having legs (601a1, 601a2, 610a, 601b1, 601b2, 610b), where each half (601a, 601b) has a cross-section in the general shape of the letter "E," which halves (601a, 601b) fit together with a gap (612) between the center legs (610a, 610b) of the halves (601a, 601b). In this second variant, the first magnetic path includes the center leg (610a) of one of the halves (601a) of the core (601), and the second magnetic path includes the center leg (610b) of the other one (601b) of the halves of the core (601). In a third variant, the magnetic core (701) is in the form of an E core in two halves (701a, 701b), each of which halves (701a, 701b) has a cross-section defining three legs (701a1, 701a2, 710a, 701b1, 701b2, 710b) and a base (701ab, 701bb) in the general shape of the letter "E," which halves (701a, 701b) fit together with a first gap (712) between the center legs (710a, 710b) of the halves (701a, 701b) and a second gap (714) between one pair (701a1, 701b1) of outer legs. In this third variant, the first magnetic path includes the one pair of outer legs (701a1, 701b1) of the halves (701a, 701b) of the core and the second gap (714), and the second magnetic path includes the other ones (701a2, 701b2) of the outer legs of the halves (701a, 701b) of the core (701) and no gap.

In yet another hypostasis of the invention, the combining arrangement comprises a direct-voltage blocking capacitor (Cb). This blocking capacitor (Cb) may be placed in series with the inductive winding (N2) of the one embodiment or in series with the secondary winding (N2) and inductor (L2) of the other embodiment.

What is claimed is:

1. A power supply, comprising:

a pair of load terminals;

a storage capacitor coupled across said pair of load terminals;

first inductance means coupled to said storage capacitor to thereby form a combined circuit;

a source of voltage, which voltage includes a direct voltage component and a time-varying voltage component, said source of voltage being coupled to said combined circuit for producing a flow of current therethrough, which flow of current results in division of said direct voltage component and said time-varying voltage component between at least said first inductance means and said storage capacitor, whereby that portion of said time-varying voltage component appearing across said first inductance means tends to cause a time-varying current flow through said first inductance means and said storage capacitor;

magnetically coupled inductive means responsive to said time-varying voltage component appearing across said inductance means, for generating a second time-varying current component in response thereto, which second time-varying current component is similar to said time-varying current flow through said first inductance means; and combining means coupled to said combined circuit and to said magnetically coupled inductive means, for combining said second time-varying current component with at least said time-varying current flow in such a manner as to tend to oppose said time-varying current flow.

2. A power supply according to claim 1, wherein said source of voltage includes a switch which recurrently applies a direct voltage to said combined circuit, and applies a reference potential across said combined circuit during those intervals in which said direct voltage is not applied, whereby said time-varying component is a rectangular wave.

3. A power supply according to claim 1, wherein said magnetically coupled inductive means comprises an inductive winding magnetically coupled to said first inductive means, whereby said second time-varying current component is directly generated.

4. A power supply according to claim 1, wherein said magnetically coupled inductive means comprises:
  a transformer including a primary winding coupled across said first inductance means, and also including a secondary winding across which a secondary voltage is generated in response to said time-varying voltage component appearing across said first inductance means; and
  an inductor coupled in series with said secondary winding of said transformer, for producing said second time-varying current component in response to said secondary voltage.

5. A power supply according to claim 1, wherein said combining means comprises a direct-voltage blocking capacitor.

6. A power supply according to claim 1, wherein said source of voltage comprises:
  a phase-shifted full-wave switched bridge circuit including first and second tap points across which an alternating voltage is generated;
  a transformer including a primary winding connected to said first and second tap points and also including a secondary winding across which a varying voltage is generated in response to said alternating voltage; and
  rectifying means coupled to said secondary winding for converting said varying voltage into a varying direct voltage.

7. A power supply according to claim 1, wherein said first inductance means and said magnetically coupled inductive means responsive to said time-varying voltage component appearing across said inductance means, for generating a second time-varying current component in response thereto, comprises a unitary arrangement, said unitary arrangement comprising:
  a magnetic core including first and second spaced-apart magnetic paths through which magnetic flux flows, said first inductance means including a conductor winding about said first magnetic path and said magnetically coupled inductive means comprising a conductor winding about said second magnetic path.

8. A power supply according to claim 7, wherein said magnetic core is in the form of two half-cores, each having a cross-sectional shape in the general form of the letter "U," and spaced apart by a pair of gaps located at the distal ends of said legs, and wherein said first magnetic path comprises one leg of each of said halves together with one of said gaps, and said second magnetic path comprises another leg of each of said halves together with another of said gaps.

9. A power supply according to claim 7, wherein said magnetic core is in the form of one of an E or pot core in two halves having legs, each having a cross-section in the general shape of the letter "E," which halves fit together with a gap between the center legs of said halves, and wherein said first magnetic path includes said center leg of one of said halves of said core, and said second magnetic path includes said center leg of the other one of said halves of said core.

10. A power supply according to claim 7, wherein said magnetic core is in the form of an E core in two halves, each of which halves has a cross-section defining three legs and a base in the general shape of the letter "E," which halves fit together with a first gap between the center legs of said halves and a second gap between one pair of outer legs, and wherein said first magnetic path includes said one pair of outer legs of said halves of said core and said second gap, and said second magnetic path includes the other of said outer legs of said halves of said core and no gap.

11. A method for generating a direct voltage across load terminals, said method comprising the steps of: capacitor connected across the load terminals:
  integrating first current applied to a storage
    applying to an inductor a voltage including a direct component and a varying component, to thereby generate said first current, whereby said varying component of said first current, when integrated by said storage capacitor, produces unwanted variations in the load voltage;
  applying said voltage including a direct component and a varying component to a second inductive arrangement, for thereby producing a current surrogate including a varying component corresponding to said varying current component and lacking a component corresponding to said direct component; and
  coupling said current surrogate to said capacitor in such a manner that said current surrogate reduces the amplitude of said varying component of said first current.

12. A method according to claim 11, wherein said step of applying said voltage including a direct component and a varying component to a second inductive arrangement, for thereby producing a current surrogate including a varying component corresponding to said varying current component and lacking a component corresponding to said direct component, includes the further step of:
  applying said voltage including a direct component and a varying component to the primary winding of a transformer, and taking from a secondary winding of said transformer a secondary voltage; and
  applying said secondary voltage to second inductor, to produce said current surrogate including a varying component corresponding to said varying current component and lacking a component corresponding to said direct component.

13. A method according to claim 11, wherein said step of applying said voltage including a direct component and a varying component to a second inductive arrangement, for thereby producing a current surrogate including a varying component corresponding to said varying current component and lacking a component corresponding to said direct component, includes the further step of:
  applying said voltage including a direct component and a varying component to a first inductive winding of a loosely coupled winding arrangement, and taking from a second winding of said loosely coupled winding arrangement said current surrogate including a varying component corresponding to said varying current component and lacking a component corresponding to said direct component.

14. A power supply, comprising:
  a source of voltage defining first and second terminals:

a controlled switch including a first electrode coupled to said first terminal of said source of voltage and defining a second electrode, for recurrently coupling said voltage to said second electrode of said controlled switch;
  unidirectional current conducting means connected to said second electrode of said controlled switch and to said second terminal of said source of voltage, poled for nonconduction when said voltage is coupled to said second electrode of said controlled switch;
  a storage capacitor including a first electrode connected to said second terminal of said source of voltage and also including a second electrode common with a load terminal, for integrating current applied thereto for generating a load voltage;
  an inductor connected to said second electrode of said controlled switch and to said second electrode of said storage capacitor, for generating an inductor current in response to the voltage at said second electrode of said controlled switch, which inductor current includes direct and varying current components;
  a transformer including a secondary winding and also including a primary winding coupled across said inductor, for producing a voltage at said secondary winding related to the voltage across said inductor;
  a second inductive arrangement coupled to said secondary winding of said transformer, for producing a current surrogate having properties similar to said varying component of said inductor current; and
  a combining arrangement including a blocking capacitor coupled to said second inductive arrangement and to said storage capacitor, for adding said current surrogate to said inductor current flowing to said storage capacitor, in a manner such as to tend to cancel said time-varying component of said inductor current.

15. A power supply, comprising:
a source of voltage defining first and second terminals:
  a controlled switch including a first electrode coupled to said first terminal of said source of voltage and defining a second electrode, for recurrently coupling said voltage to said second electrode of said controlled switch;
  unidirectional current conducting means connected to said second electrode of said controlled switch and to said second terminal of said source of voltage, poled for nonconduction when said voltage is coupled to said second electrode of said controlled switch;
  a storage capacitor including a first electrode connected to said second terminal of said source of voltage and also including a second electrode common with a load terminal, for integrating current applied thereto for generating a load voltage;
  an inductor connected to said second electrode of said controlled switch and to said second electrode of said storage capacitor, for generating an inductor current in response to the voltage at said second electrode of said controlled switch, which inductor current includes direct and varying current components;
  an inductive second winding loosely coupled to said inductor, said inductive second winding producing a current surrogate having properties similar to said varying component of said inductor current; and
  a combining arrangement including a blocking capacitor coupled to said second inductive winding and to said storage capacitor, for adding said current surrogate to said inductor current flowing to said storage capacitor, in a manner such as to tend to cancel said varying component of said inductor current.

* * * * *